(12) United States Patent
Hauser

(10) Patent No.: US 7,894,134 B1
(45) Date of Patent: Feb. 22, 2011

(54) SINUSOIDAL POLARIZATION

(76) Inventor: David Hauser, 2160 Merokee Dr., Merrick, NY (US) 11566

( * ) Notice: Subject to any disclaimer, the term of this patent is extended or adjusted under 35 U.S.C. 154(b) by 829 days.

(21) Appl. No.: 11/743,199

(22) Filed: May 2, 2007

(51) Int. Cl.
 *G02B 5/30* (2006.01)
(52) U.S. Cl. .................................... 359/501; 359/489
(58) Field of Classification Search .................. None
 See application file for complete search history.

(56) References Cited

U.S. PATENT DOCUMENTS

| | | | | |
|---|---|---|---|---|
| 2,380,363 | A | * | 7/1945 | Land et al. ................. 359/490 |
| 2,617,329 | A | * | 11/1952 | Dreyer ...................... 359/489 |
| 3,521,300 | A | * | 7/1970 | Weiss ........................ 250/225 |
| 4,958,892 | A | | 9/1990 | Jannson et al. |
| 5,646,733 | A | | 7/1997 | Bieman |
| 6,395,398 | B1 | | 5/2002 | Nakashima et al. |
| 6,984,038 | B2 | | 1/2006 | Ishak |
| 7,066,596 | B2 | | 6/2006 | Ishak |

* cited by examiner

*Primary Examiner*—Lee Fineman
(74) *Attorney, Agent, or Firm*—Davidoff Malito & Hutcher LLP

(57) ABSTRACT

A linearly polarized transparent or translucent material is stretched to follow a sinusoidal shape so all parts of the resulting panes or lenses are themselves sinusoidal. By providing a structure of two panes or lenses of such material, moving one relative to the other in a linear direction varies an amount of light passing through. Thus, such a linear movement adjusts light translucence, luminosity intensity, brightness and dimness. Applications include windows (home, office, car), motor vehicle windshields, sunglasses, optical lenses, computer monitors, televisions, and fluorescent light fixtures.

14 Claims, 10 Drawing Sheets

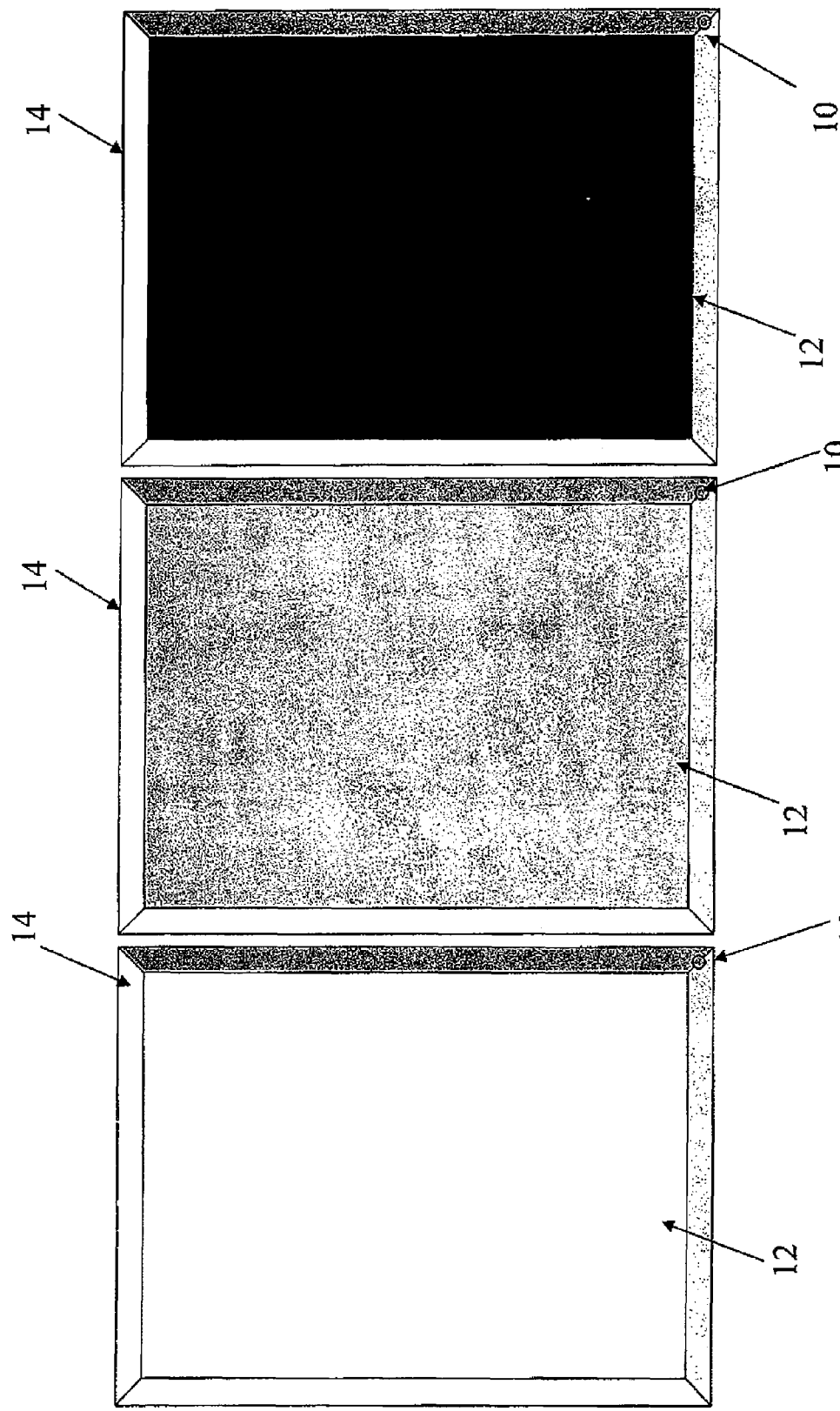

0°

90°

0°
Full translucence

18°
Nearly full translucence

54°
Partial translucence

36°
Considerable translucence

72°
Slight translucence

90°
No translucence

SINUSOIDAL POLARIZATION

FIELD OF THE INVENTION

The present invention relates to a structure having pairs of translucent or transparent material each "sinusoidally" polarized. The light translucence through the pairs varies depending upon the relative position of one of the pairs to the other. The relative position is changed by moving one of the pairs relative to the other in a linear direction. As a consequence, brightness, luminosity strength adjustment or dimming adjustment through the structure may be realized.

DISCUSSION OF RELATED ART

The subject matter of U.S. Pat. No. 1,918,848, which is incorporated herein by reference, reveals a synthetic material consisting of many microscopic crystals of iodoquinine sulfate (herapathite) embedded in a transparent nitrocellulose polymer film. The needle-like crystals may be aligned during manufacture of the film by stretching or by applying electric or magnetic fields, thereby providing a linearly polarized synthetic plastic sheet.

With the crystals aligned, the sheet is dichroic. This material (a J-sheet polarizer) was later replaced by a polyvinyl alcohol (PVA) polymer impregnated with iodine (an H-sheet polarizer). During manufacture of the H-sheet polarizer, the PVA polymer chains are stretched such that they form an array of aligned, linear molecules in the material. The iodine dopant attaches to the PVA molecules and makes them conductive along the length of the chains.

Light polarized parallel to the chains is absorbed, and light polarized perpendicular to the chains is transmitted. Another polarizer type is the K-sheet polarizer, which consists of aligned polyvinylene chains.

When a film consisting of a specific series of compounds during its manufacture is stretched or exposed to specific kinds of electric or magnetic fields, the relevant microscopic components become aligned along the stretch (or electric field) and therefore are linearly polarized.

When two conventional linearly polarized panes (or films applied to panes) are placed one atop the other, the relative orientation of their respective polarizations determines how much light passes through the two panes or films. One of the two panes or films needs to be rotated relative to the other to vary the amount of light that passes through both. The drawback is that such construction has limited uses where a rotatable window structure is suitable, such as for airplanes or ceiling windows. Such rotatable window structures are not used in polygonal window structures that are commonplace in offices, homes and automobiles.

In the case of a rotatable window structure, when the orientation of the two panes or films is such that the polarizations of each pane (or film) are completely parallel, then any light entering one will exit the other that shares the same angle of incidence as that of the polarization. When the two panes are turned relative to one another such that the pair of panes has somewhat out-of-phase polarizations, less light passes through both because only a subset of light that is perpendicular to each phase can pass through both panes. When they are further rotated to become 90 degrees out of phase, no light passes through the pair.

U.S. Pat. Nos. 4,123,141 and 4,285,577 show window structures that use polarizer panes without rotating them. The window is divided into left and right halves and there is a movable half-window pane that carries at least a wave plate. The wave plate has a thickness selected to optically rotate the direction of polarization of incident light by 90 degrees. When the movable half-window pane is in a first half of the window, due to crossed polarization in each half of the window, no light is transmitted and the window is opaque. When the user moves the half-window pane to the second half of the window, due to polarization alignment in each half of the window, light is transmitted and the window is open.

U.S. Pat. No. 5,164,856 shows in FIG. 9 a periodic polarizing structure consisting of two sheets of wave-like segments. The patent mentions that its invention is based on the phenomena that if two superimposed polarizer sheets are polarized in the same direction, such as vertical, light will pass through the two sheets. If one of the superimposed sheets is polarized orthogonally relative to the other, that is horizontal, then light will not pass.

The present inventor has made some observations about the product formed of two sheets of wave-segment of FIG. 9 of U.S. Pat. No. 5,164,856.

First, the product envisioned from that patent does use two panes which when moved side to side relative to one another alters the net translucence. However, the product has a number of limitations, because the pane is actually not sinusoidal at all.

Instead, sinusoidal strips are cut from a linearly polarized pane. These strips (which follow a sinusoidal shape) are all linearly polarized. Another linearly polarized pane is rotated 90 degrees and thereafter further sinusoidal strips are cut out. As a consequence, there are two sets of sinusoidal strips of panes. One set contains sinusoidal strips that are all linearly polarized horizontally and the other set contains sinusoidal strips that are polarized vertically.

Thus, if a horizontally polarized strip is placed on top of a vertically polarized strip, the two are out of phase and thus no light will pass through. To construct the panes, the sinusoidal strips abut one adjacent to the next, yet alternates vertical and horizontal polarized strips (hereafter referred to respectively as v strip and h strip)—thus a pane is one h strip atop one v strip atop one h strip atop one v strip, etc. So when two panes are placed one in front of the other, they are aligned such that any h strip on one pane is directly in front of an h strip on the other pane, and likewise any v strip on one pane is in front of only a v strip on the other pane.

When one pane is moved left/right relative to another, some or all of the h strips in one pane are in front of some of all of the v strips in the other pane. Since the h and v are oriented 90 degrees relative to each other, no light passes.

However, unless they are oriented 0 degrees or 90 degrees out of phase such that all light passes or no light passes, the arrangement is problematic for partial light conditions. Consider the situation with 50% of all light passing through. This means that half of each v strip on one pane is in front of another v strip of the other pane while half is over an h strip.

Some sections of the paired system of panes is an h in front of an h and a v in front of a v thus those sections will have all light passing through. Yet some sections of the paired system of panes is an h in front of a v and a v in front of an h and thus those sections will have no light passing through.

Therefore, for partial light to work on this system, it requires some sections of the system to be dark while others fully translucent. Hence this product is better suited for 0% or 100% translucent, not anything between.

This product is also not reliant per se on a sinusoidal shape. Consider the following variant: take a set of thin, wide rect-angles of polarized glass, for instance 12 inches long by 1 inch high. Two sets of these 12"×1" can 1 be made . . . one set are all h polarized and another set all v. Then a new pane can be assembled by alternating abutment of 1 v above 1 h above 1 v above 1 h. Thus, it relies on alternative section of the pane between h and v polarization.

It would be desirable to provide polarized panes or lenses that not only work for 0% and 100% translucence, but also work for any levels in between, since every section of the system will be equally translucent. It is desirable to adjust brightness, luminosity strength, dimness and translucence through a polarized structure by moving one of two panes or lenses of polarized translucent or transparent material in a linear direction relative to the other.

SUMMARY OF THE INVENTION

One aspect of the invention resides in stretching a linearly polarized transparent or translucent material to take on a sinusoidal shape so that polarization of the resulting window panes or lenses is sinusoidal. That is, linear vectors of a linearly polarized sheet deform into sinusoids by stretching them transversely (perpendicular).

When two such panes or lenses are placed in front of one another and moved left/right relative to one another, all parts of the system are equally in or out of phase and thus all parts of the system yield the same level of translucence.

Preferably, the structure of the invention contains two panes of glass, Plexiglas, translucent plastic, etc. Both panes are configured to have the same dimensions and each is sinusoidally polarized with the same amplitude and frequency of their respective sinusoids. These two panes are contained within a frame, within which is contained a movable track to which one of the two panes is affixed. The other pane is affixed to the frame so it cannot move.

By turning a dial protruding from the frame, either manually or via a mechanical or electrical means, or by some mechanical or electrical means contained fully within the frame, the movable track moves thus causing one of the panes to move relative to the other in unison with the movable track. Given the nature of the sinusoidal polarization, the net translucence through this two pane system can be adjusted smoothly from 100% translucent to 0% translucent with any level in between.

BRIEF DESCRIPTION OF THE DRAWING

For a better understanding of the present invention, reference is made to the following description and accompanying drawings, while the scope of the invention is set forth in the appended claims.

FIGS. 1-3 are front views of a control dial respectively set to full translucence, partial translucence and no translucence in accordance with the invention.

DESCRIPTION OF THE PREFERRED EMBODIMENT

FIG. 1 shows a control dial 10 set to full translucence. There are two layers 12 of translucent or transparent material, such as clear glass, plastic or Plexiglas, within a frame 14. The light passes through the two layers 12 essentially unobstructed.

FIG. 2 shows the control dial 10 set to partial translucence. The light is partially obstructed through the two layers 12.

FIG. 3 shows the control dial 10 set to no translucence. The light is fully obstructed to block out translucence through the two layers 12.

Figure 5:
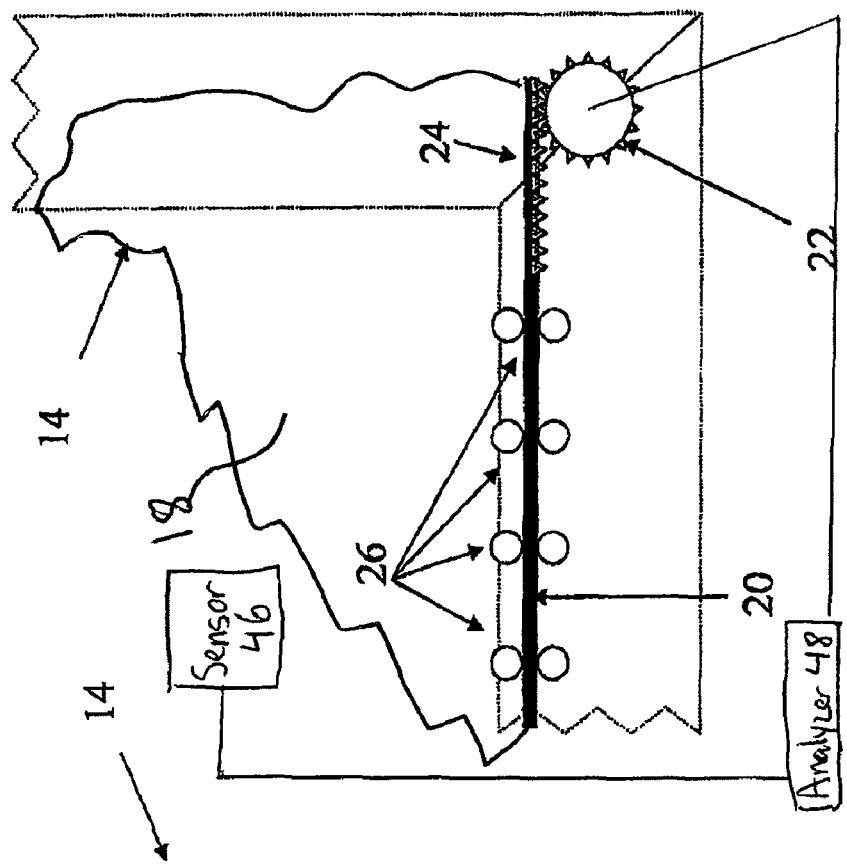
FIG. 5 is an interior, partially broken back planar view of rolling track supports on a movable track in accordance with the invention, as well as track teeth and translucence control dial gears.
Figure 4:
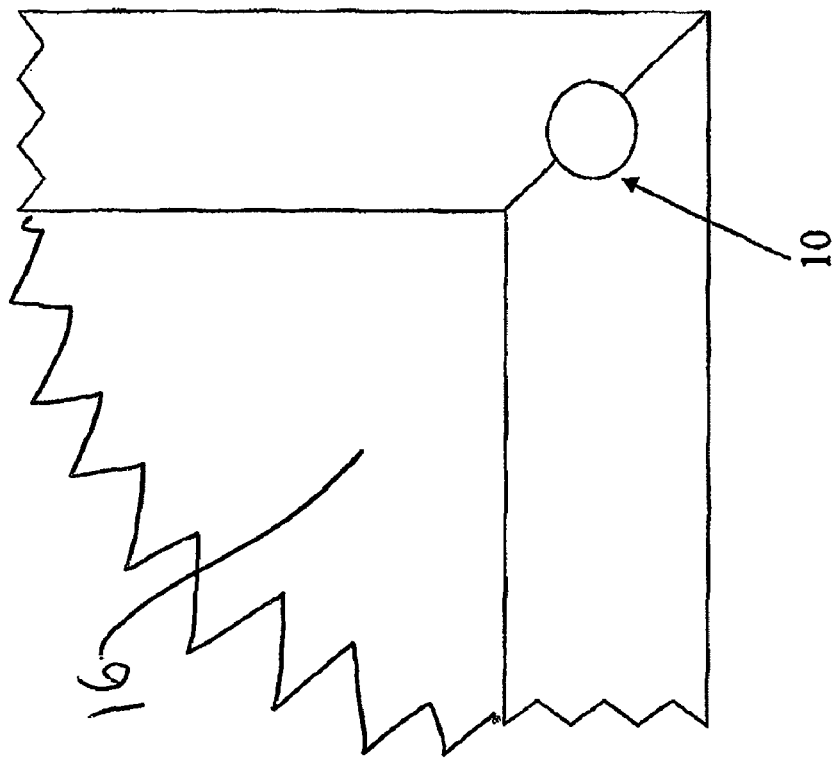
FIG. 4 is an exterior, partially broken planar view of the frame with translucence control dial in accordance with the invention.

As seen in FIGS. 4 and 5, the front pane 16 is affixed to the frame 14 and is stationary. The back pane 18 is affixed to a movable track 20 and may move left or right only. The movement arises in response to the turning of translucence control dial gears that mesh 22 with track teeth 24. The track teeth 24 are mounted to the movable track 20, which is guided by rolling track supports 26. The rolling track supports 26 may include a series of cylindrical or spherical rollers that are spaced apart to allow the movable track 20 to move relative to the stationary frame. Further, FIG. 5 shows an optional sensor 46 arranged to sense translucence of the front pane 16 and back pane 18, and a corresponding optional analyzer 48 arranged to direct actuation of the mechanism, i.e., the control dial 10, to move the back pane 18 along the movable track 20 based upon a determination as to whether the translucence sensed by the optional sensor 46 meets criteria, or the control dial 10 can be manually adjusted by the user at will.

Figure 6:
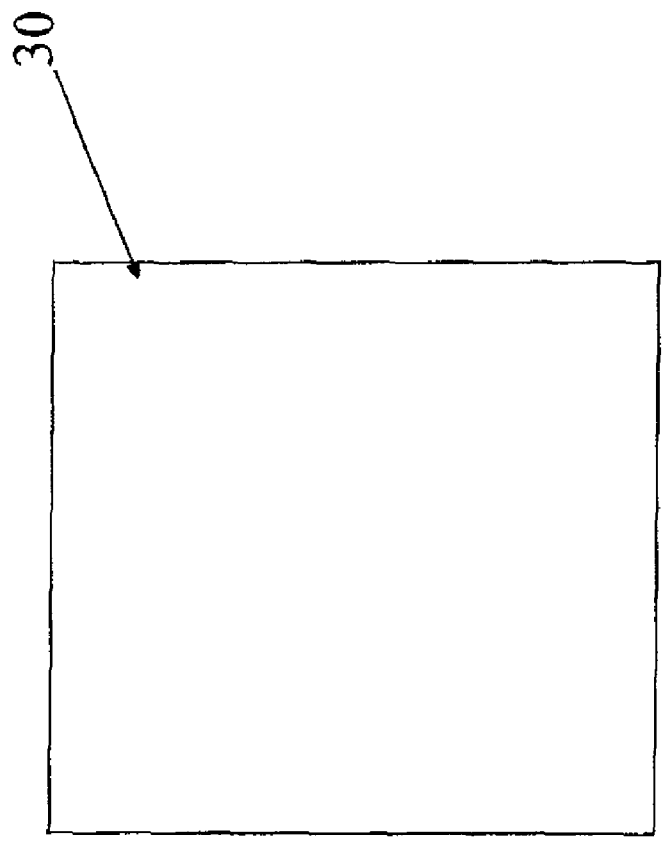

FIG. 6 shows a conventional translucent material 30, such as glass, Plexiglas, etc. All light may pass through.

Figure 7:
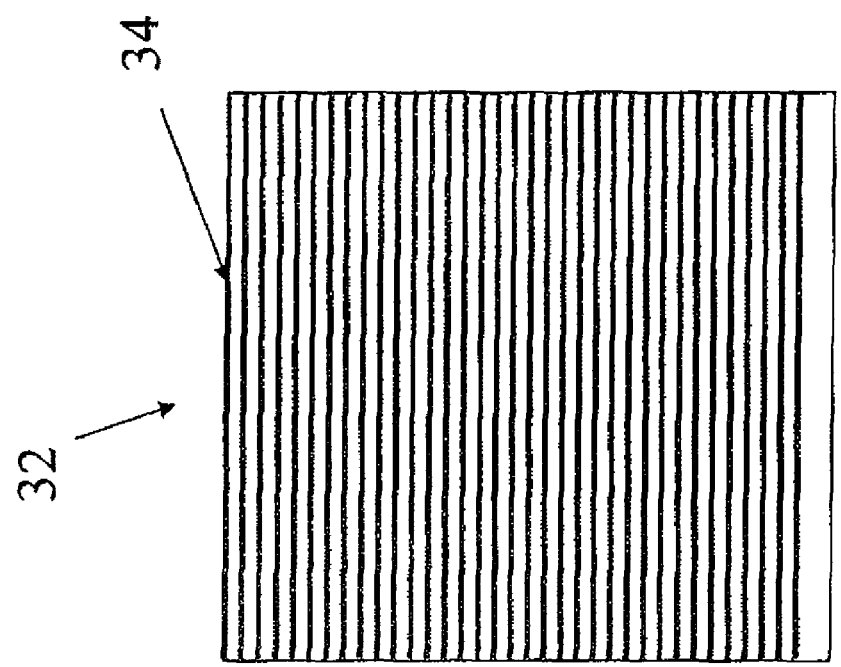
FIGS. 6 and 7 are front views of translucent materials, with FIG. 6 showing the translucent material non-polarized and FIG. 6 showing the translucent material linearly polarized.

FIG. 7 shows a conventional linearly polarized translucent material 32. Each of the slits 34 is not truly visible to the naked eye. However, FIG. 7 depicts the concept that the relevant molecules within the pane are all linearly aligned in the same fashion. Since light behaves like a wave, the horizontally oscillating light waves will be unable to pass through the "slots" on this pane, and only the vertical component of all other light can pass through. Any vertical component of the wave oscillation will not be filtered and thus pass through.

As light passes through a pane of linearly polarized translucent material that is polarized horizontally, only the vertical component of the light waves pass. The horizontal component of the light wave is filtered.

Figure 8:
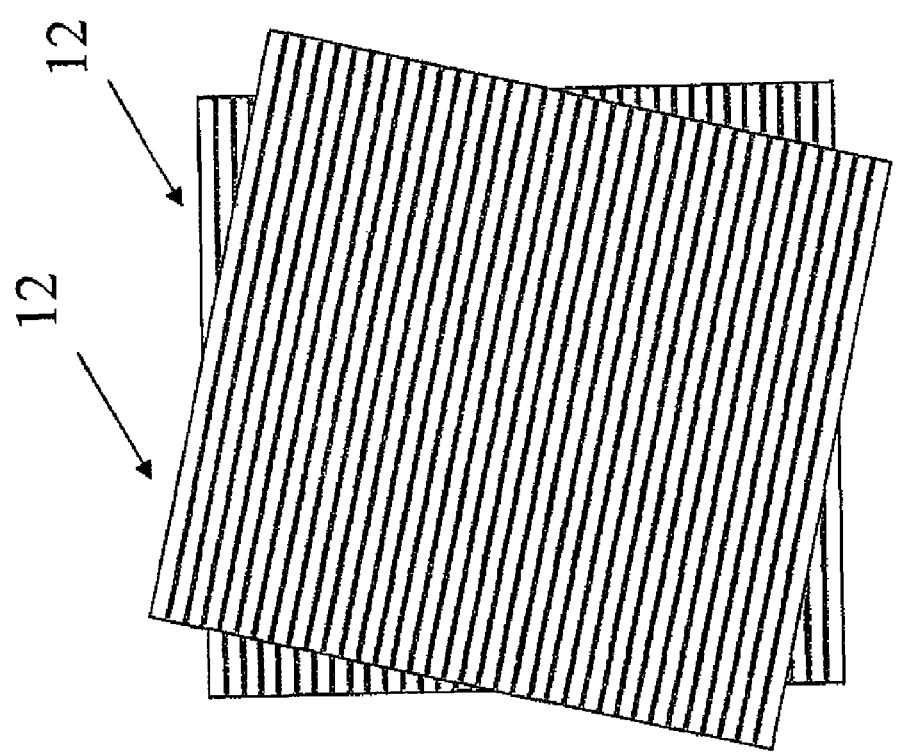
FIG. 8 is a planar view of two conventional linearly polarized translucent materials that are similarly polarized and arranged one atop the other with the top one rotated relative to the bottom one.

FIG. 8 shows panes of linearly polarized translucent materials 12, 13 each polarized horizontally. If two similarly polarized panes are placed atop one another and one is rotated about the other, the light that passes through this pair must meet both polarizations. In this case, the back pane only allows the vertical component of the light waves to pass, the front only allows the subset of that light that is 30 degrees rotated, thus yields a net reduced translucence.

Figure 9:
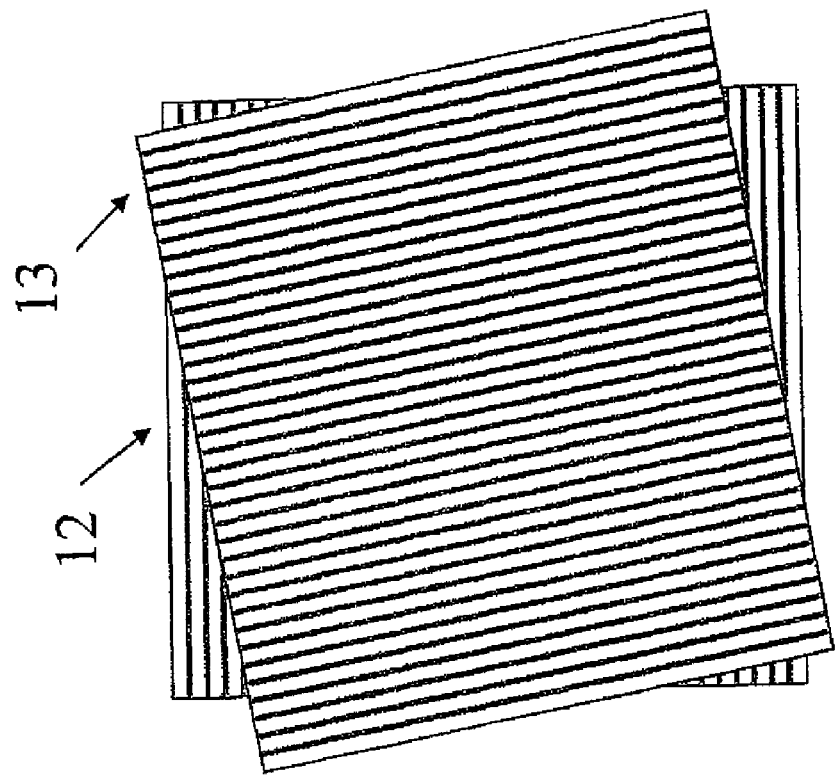
FIG. 9 is a planar view of two conventional linearly polarized translucent materials arranged one atop the other with the top one rotated relative to the bottom one.

FIG. 9 shows two panes of linearly polarized translucent materials 12 each polarized differently from each other. That is, the top material is polarized vertically while the bottom material is polarized horizontally.

In this case, the back pane only allows the vertical component of the light waves to pass, the front only allows the subset of that light that is almost 90 degrees rotated, thus yields almost zero translucence.

The problem with the design of FIGS. 8 and 9 is in practicality of use. Unless one rotates one window pane about the other, it cannot be easily or practically used in a home, office, or car, nor in eye glasses, fluorescent light covers, computer monitors, etc.

The present invention provides a solution. Instead of using two linearly polarized lenses to rotate about one another to produce differing degrees of phase dissimilarities between the two panes, two sinusoidally polarized panes are used. Such sinusoidally polarized panes can be moved side-to-side rather than rotated to produce the same angle of phase dissimilarities of the two panes thus yielding the same translucence controllability.

In the case of a linearly polarized sheet, relevant molecules align in a linearly parallel fashion. In the case of a sinusoidal polarized sheet, the sinusoids have both relevant molecules that align in a linearly parallel fashion as well as molecules that form the peaks and valleys of the sinusoid.

Figure 10:
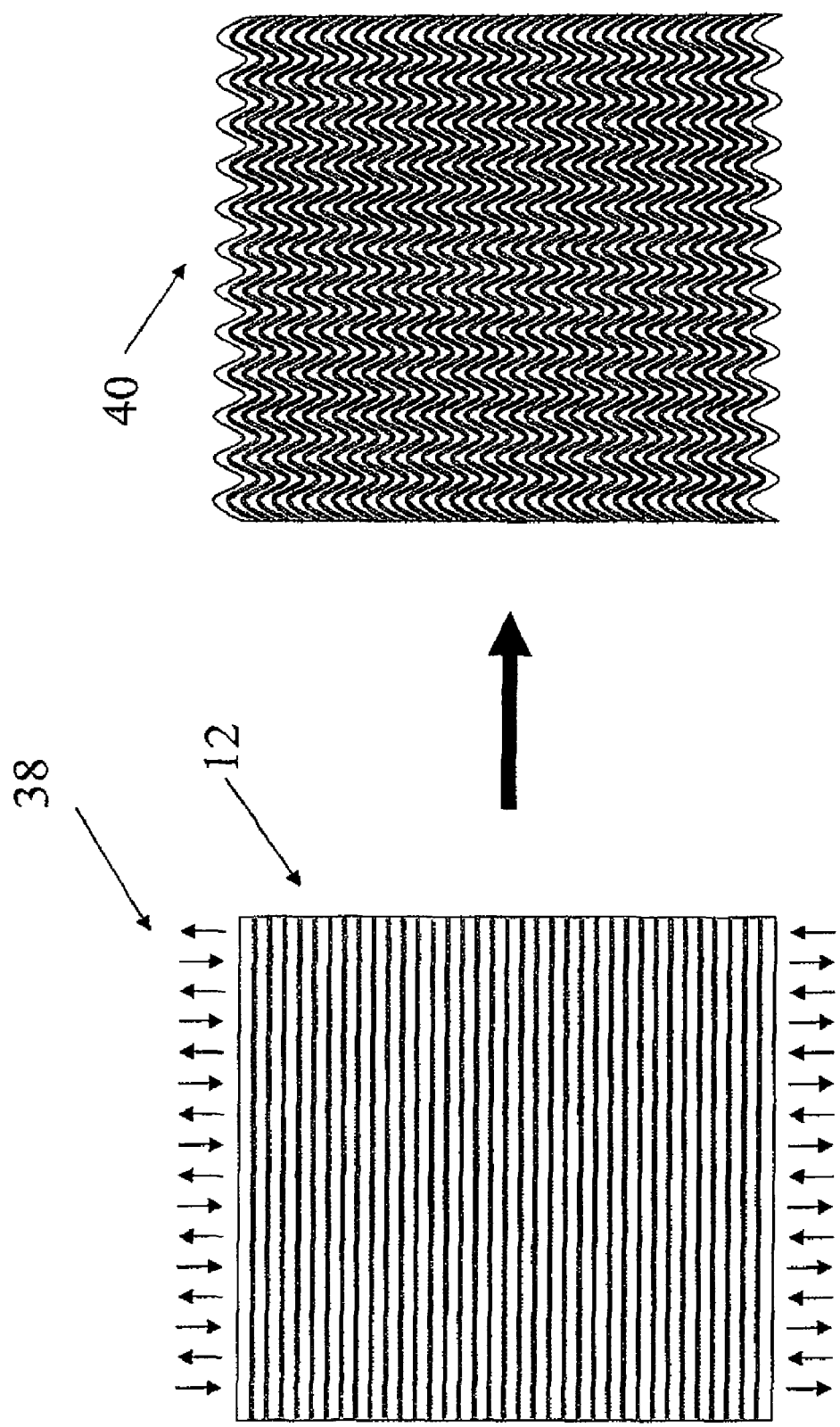
FIG. 10 are explanatory planar views showing the process in accordance with the invention of stretching a softened linearly polarized translucent material to form a sinusoid.

FIG. 10 shows a pane 38 of a linearly polarized translucent material 12 prior to softening it for stretching in accordance with the invention. After softening and stretching the linearly polarized translucent material 12 per the indicated arrows, the result is a sinusoidally polarized material 40.

Figure 11:
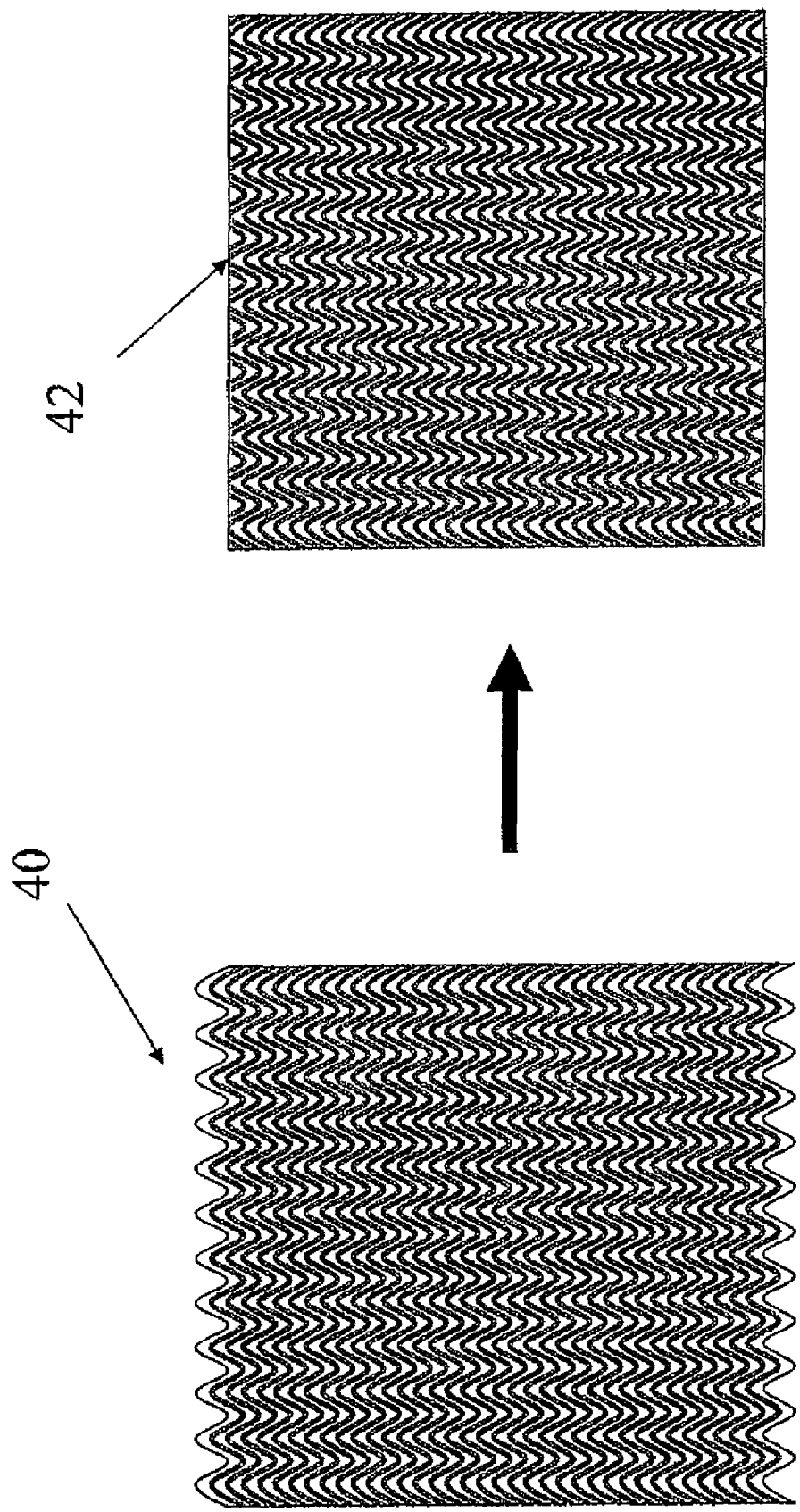
FIG. 11 are explanatory planar views showing the process in accordance with the invention of scoring peripheral edges of the sinusoidally polarized translucent material of FIG. 10.

One thereafter scores and cuts the top and bottom of the sinusoid protruding edges 42 to yield rectangular panes in the manner of FIG. 11. Any shape can be created with small changes to the process. The scoring defines a periphery of the panes and may sever peaks of the sinusoid protruding edges.

Figure 12:
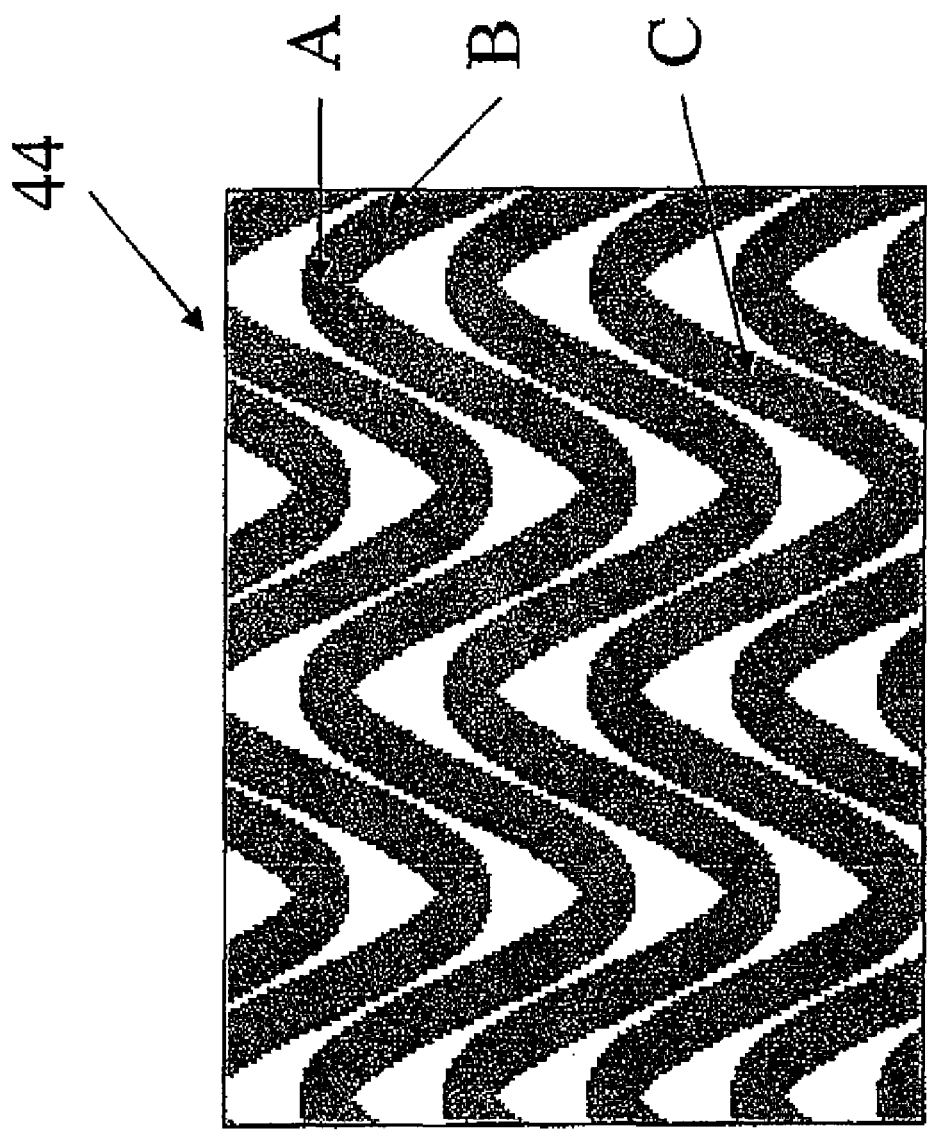
FIG. 12 is a planar view of the scored sinusoidally polarized material of FIG. 11.

Turning to FIG. 12 for the "piece" of light that is entering any one part of the pane with polarization in a sinusoidal pattern 44, that microscopic part of the sinusoidally polarized section dictates what aspect of the light wave can traverse.

For instance, at point A, the polarization is horizontal and thus only the horizontal component of the oscillation of the wave of light will be unable to traverse.

At point B, however, the polarization is diagonally downward to the right and thus only the component of the oscillation of the wave of light that is parallel to this cannot traverse.

At point C, only the component of the wave of light that oscillates parallel to the upper right diagonal direction will be unable to traverse.

Figure 13:
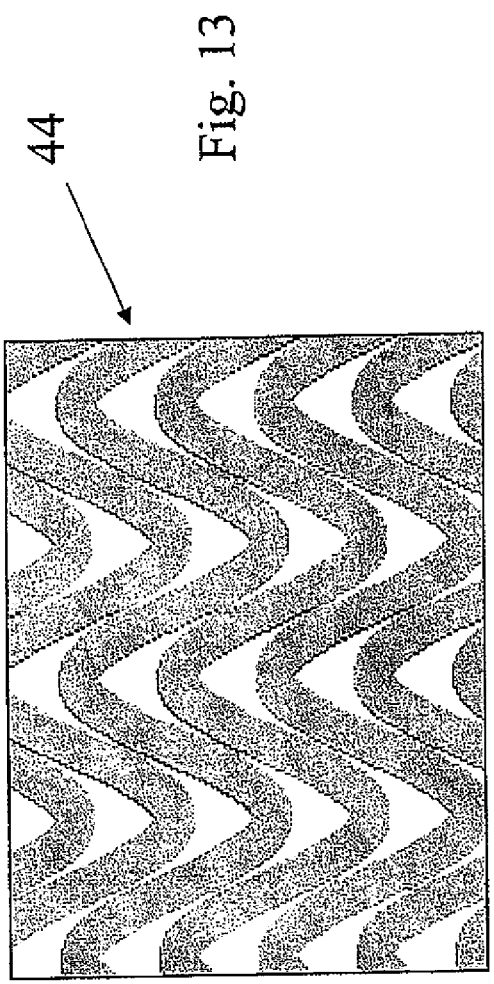
FIG. 13 is a planar view of two panes of sinusoidally polarized material overlapping each other completely in phase with each other.

Turning to FIG. 13, when the sinusoid patterns 44 of the two panes completely overlap, there is no net reduction in translucence.

Figure 14:
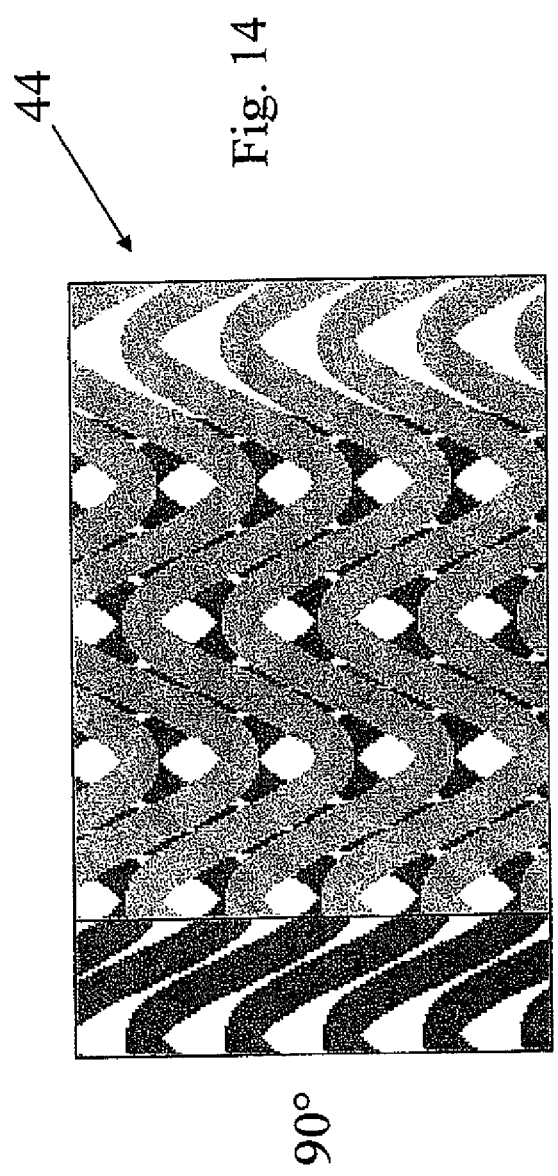
FIG. 14 is a planar view of two panes of sinusoidally polarized material overlapping each other completely out of phase with each other.

Turning to FIG. 14, when the sinusoid patterns 44 of the two panes are positioned such that every point in the sine curve of one pane is atop of a point 90 degrees out of phase from the sine curve of the other pane, all points of the pair of panes are therefore 90 degrees out of phase. This yields a condition precisely the same as two linearly polarized panes rotated 90 degrees relative to one another—zero translucence.

Figure 15:
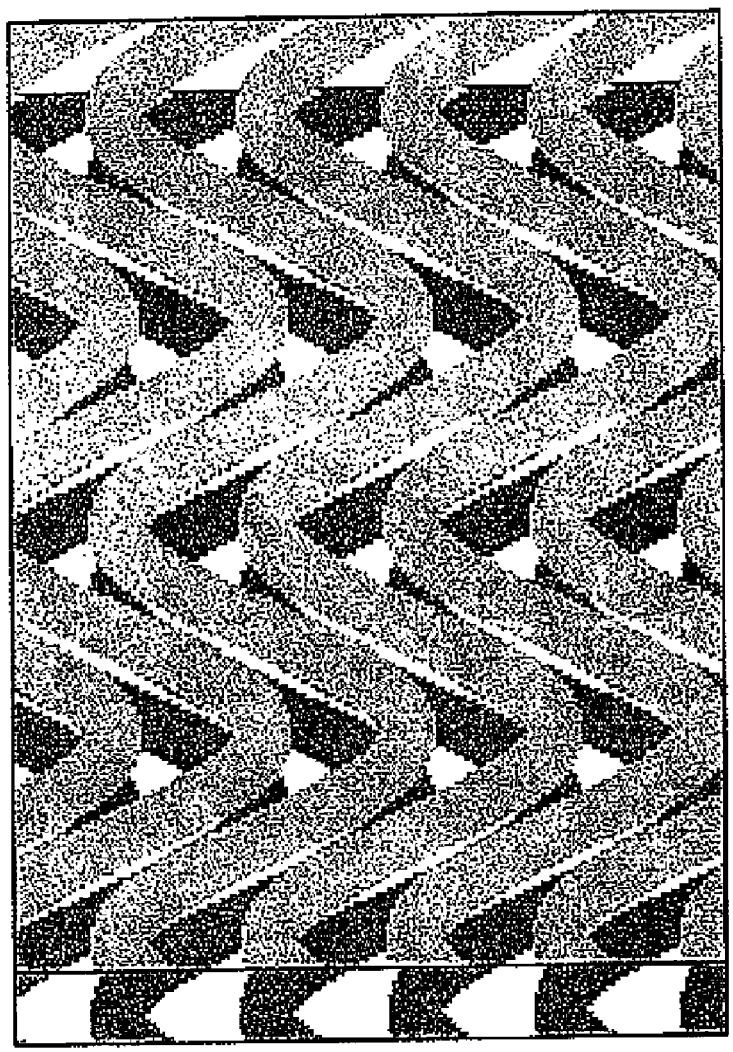
FIG. 15 is a planar view of two panes of sinusoidally polarized material overlapping each other 45 degrees out of phase with each other.

Turning to FIG. 15, when the sinusoid patterns 44 of the two panes are positioned such that every point in the sine curve of one pane is atop of a point 45 degrees out of phase from the sine curve of the other pane, all points of the pair of panes are therefore 45 degrees out of phase. This yields a condition precisely the same as two linearly polarized panes rotated 45 degrees relative to one another, thus yielding a decreased net translucence down to 50% of the unfiltered light.

Figure 16:
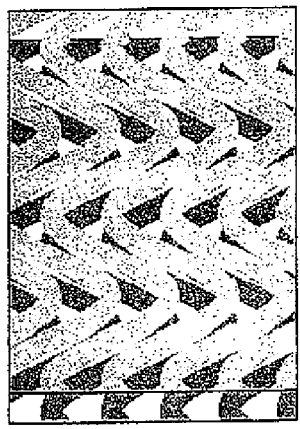
FIGS. 16-21 are successive planar views of sinusoidally polarized material overlapping each other increasingly out of phase with each other.

FIGS. 16-21 illustrate changes in translucence from increasing the degree that sinusoid patterns 44 of the two panes are out of phase with each other. In the case of FIG. 16, the sinusoid patterns 44 of the two panes of sinusoidal polarized translucent material are completely in phase and thus 0 degrees out of phase, resulting in full translucence.

Figure 17:
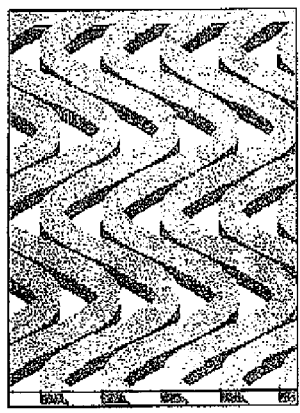
Figure 19:
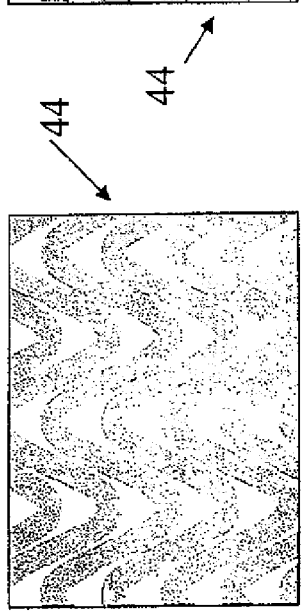
Figure 18:
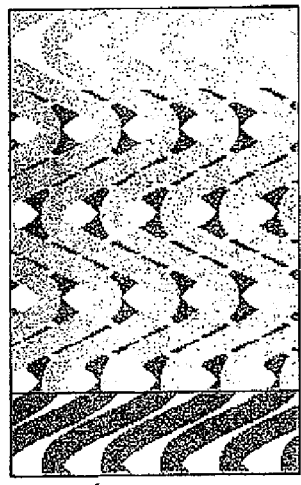
Figure 20:
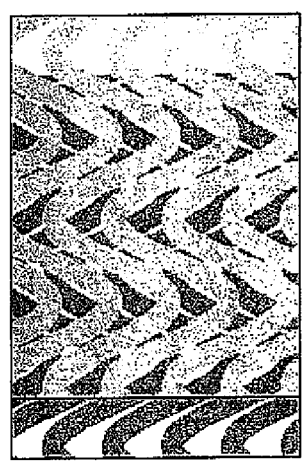

In the case of FIG. 17, there is nearly full translucence, because the sinusoid patterns 44 of the tow panes are only 18 degrees out of phase. In the case of FIG. 18, there is still considerable translucence even though the sinusoid patterns 44 of the two panes are 36 degrees out of phase. In the case of FIG. 19, there is only partial translucence, because the sinusoid patterns 44 of the two panes are 54 degrees out of phase. In the case of FIG. 20, there is still slight translucence even though the sinusoid patterns 44 of the two panes are 72 degrees out of phase.

Figure 21:
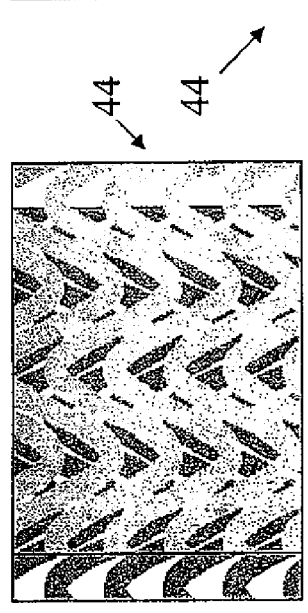

In the case of FIG. 21, there is no translucence, because the sinusoid patterns 44 of the two panes are 90 degrees out of phase.

The present invention is therefore directed at a sinusoidal polarizer, preferably two films (applied to respective panes or lenses), two panes or two lenses arranged one in front of the other that are made of glass, plastic, or other light transparent or translucent material. Each has sinusoidal polarization patterns. The two films, panes, or lenses are preferably placed against one another. Unlike conventional polarized panes or lenses or films, the sinusoidal polarizer of the invention has a sinusoid pattern of polarization, as opposed to having just a linear and parallel polarization. The sinusoids of the sinusoidal polarizer preferably share substantially the same amplitude and frequency.

In accordance with the invention, the two panes or two lenses or two films may be slid relative to one another such that their sinusoidal polarizations are 90 degrees out of phase. At such a relative position, no light will go through the pairing. However, when they are slid relative to one another such that their sinusoidal polarizations are 0 degrees out of phase, all light adhering to the polarization with go through. Thus, the panes or lenses are moved side-to-side relative to one another, rather than rotated.

Since rotating two panes or lenses up to 90 degrees is available only for a limited number of private or commercial applications, the sinusoidal polarized pane or lens system of the present invention allows one instead to move one pane horizontally or vertically as the case may be (depending on the direction of the sinusoids) relative to each other to accomplish the goal of light/brightness control. Such has application to windows exemplified by home and office windows (to adjust the amount of light entering), motor vehicle windshields and windows (to adjust the amount of light entering), optical lenses and sunglasses (to control luminosity strength), computer monitors (control brightness), televisions (control brightness), and fluorescent light fixtures (to produce a dimming ability on fluorescent lights which typically cannot be dimmed).

When one pane or lens or film of the invention is moved relative to another along an asymptotic line of the polarized sinusoid as the sinusoids become more or less out of phase, more or less light passes through the pair of panes or lenses or films.

This two-pane or two-lens or two-film sinusoidal polarization system of the invention allows one to directly control the transparency of the system, thereby creating user-controllable brightness windows, glass and other similar devices.

While the foregoing description and drawings represent the preferred embodiments of the present invention, it will be understood that various changes and modifications may be made without departing from the scope of the present invention.

What is claimed is:

1. A sinusoidal polarizer, comprising a transparent or translucent material that is polarized with a pattern of polarization slits each in a stretched condition to form a spatially continuous sinusoidal or cosinusoidal shape or function.

2. A sinusoidal polarizer of claim 1, further comprising two structures arranged one in front of the other and each having the transparent or translucent material that is polarized with a pattern of the polarization slits.

3. A sinusoidal polarizer of claim 2, wherein the structures are selected from a group consisting of panes, lenses, windows, windshields, optical lenses, sunglasses, computer monitors, televisions, and fluorescent light fixtures.

4. A sinusoidal polarizer of claim 2, further comprising a frame holding the structures, the frame having a track along which one of the structures may slide relative to the other of the structures.

5. A sinusoidal polarizer of claim 4, further comprising a mechanism configured to move the one of the structures along the track upon actuation.

6. A sinusoidal polarizer of claim 5, further comprising a dial movable into a plurality of different relative positions, the mechanism being configured to move in response to movement of the dial.

7. A sinusoidal polarizer of claim 5, further comprising a sensor arranged to sense translucence of the structures, and an analyzer arranged to direct actuation of the mechanism to move the one of the structures along the track based upon a determination as to whether the translucence sensed by the sensor meets criteria.

8. A sinusoidal polarizer of claim 5, further comprising a control arranged in operative connection with the mechanism to adjust an amount of light passing through the structures.

9. A sinusoidal polarizer of claim 5, further comprising a control arranged in operative connection with the mechanism to adjust luminosity strength of the structures.

10. A sinusoidal polarizer of claim 5, further comprising a control arranged in operative connection with the mechanism to adjust brightness of the structures.

11. A sinusoidal polarizer of claim 5, further comprising a control arranged in operative connection with the mechanism to adjust dimming by the structures.

12. A sinusoidal polarizer of claim 1, further comprising scored edges that define portions of a periphery of the transparent or translucent material.

13. A sinusoidal polarizer of claim 12, wherein the scored edges truncate peaks of sinusoidal shape at the periphery.

14. A sinusoidal polarizer of claim 1, wherein the translucent or transparent material is incorporated into a structure, the structure being selected from a group consisting of windows, windows, windshields, optical lenses sunglasses, computer monitors, televisions, and fluorescent light fixtures.

* * * * *